US010658936B2

(12) United States Patent
Sun et al.

(10) Patent No.: US 10,658,936 B2
(45) Date of Patent: May 19, 2020

(54) SYSTEM AND METHOD FOR CONTROLLING A CONVERTER CIRCUIT

(71) Applicant: Macau University of Science and Technology, Taipa (MO)

(72) Inventors: Chuan Sun, Taipa (MO); Xiao Dong Li, Taipa (MO)

(73) Assignee: MACAU UNIVERSITY OF SCIENCE AND TECHNOLOGY, Taipa (MO)

( * ) Notice: Subject to any disclaimer, the term of this patent is extended or adjusted under 35 U.S.C. 154(b) by 482 days.

(21) Appl. No.: 15/587,543

(22) Filed: May 5, 2017

(65) Prior Publication Data

US 2018/0323616 A1    Nov. 8, 2018

(51) Int. Cl.
*H02J 1/10*        (2006.01)
*H02J 3/38*        (2006.01)
(Continued)

(52) U.S. Cl.
CPC ......... *H02M 3/33584* (2013.01); *H02J 3/382* (2013.01); *H02M 3/04* (2013.01);
(Continued)

(58) Field of Classification Search
CPC ......... H02M 3/33576; H02M 3/33507; H02M 3/3376; H02M 3/33584; H02M 3/04;
(Continued)

(56) References Cited

U.S. PATENT DOCUMENTS

| 10,211,747 B2 * | 2/2019 | Agamy | H02M 1/088 |
| 2016/0099646 A1 * | 4/2016 | Safaee | H02M 3/33507 363/17 |

(Continued)

OTHER PUBLICATIONS

X. Li and Y. F. Li, "An optimized phase-shift modulation for fast transient response in a dual-active-bridge converter," IEEE Transactions on Power Electronics, vol. 29, No. 6, pp. 2661-2665, 2014.

(Continued)

*Primary Examiner* — Rexford N Barnie
*Assistant Examiner* — Rasem Mourad
(74) *Attorney, Agent, or Firm* — Renner Kenner Greive Bobak Taylor & Weber

(57) ABSTRACT

Controlling operation of a converter circuit regulating power transfer between first and second voltage sources includes comparing a detected power value in the converter circuit with a power command value; determining a converter gain based on detected first and second voltage levels of the first and second voltage sources; and determining operation signals for transmitting to switches in the converter circuit during a steady state to control switching time and duration. When the detected power value differs from the power command value, the method includes determining values of two or more variables associated with adjustment of switching time and duration based on the detected first and second voltage levels; and determining operation signals to transmit to the switches during a power transition state based on the determined values of the two or more variables to adjust switching time and switching duration of the switches, thereby regulating power transition.

21 Claims, 15 Drawing Sheets

(51) Int. Cl.
  H02M 3/335 (2006.01)
  H02M 7/04 (2006.01)
  H02M 7/44 (2006.01)
  H02M 3/04 (2006.01)
  H02M 3/337 (2006.01)
(52) U.S. Cl.
  CPC ..... *H02M 3/3376* (2013.01); *H02M 3/33507* (2013.01); *H02M 3/33576* (2013.01); *H02M 7/04* (2013.01); *H02M 7/44* (2013.01)
(58) Field of Classification Search
  CPC .......... H02M 3/155; H02M 3/00; H02M 7/04; H02M 7/44
  See application file for complete search history.

(56) References Cited

U.S. PATENT DOCUMENTS

2016/0139651 A1* 5/2016 Schramm .............. G06F 1/3287 713/323
2016/0352236 A1* 12/2016 Yoo ................... H02M 3/33584
2017/0310229 A1* 10/2017 Fujisaki ................. H02M 3/28
2018/0048240 A1* 2/2018 Hayasaki .......... H02M 3/33584

OTHER PUBLICATIONS

B. Zhao, Q. Song, W. Liu, and Y. Zhao, "Transient dc bias and current impact effects of high-frequency-isolated bidirectional dc-dc converter in practice," IEEE Transactions on Power Electronics, vol. 31, No. 4, pp. 3203-3216, 2016.

K. Takagi and H. Fujita, "Dynamic control and performance of an isolated dual-active-bridge dc-dc converter," in 2015 9th International Conference on Power Electronics and ECCE Asia (ICPE-ECCE Asia). IEEE, pp. 1521-1527, 2015.

K. Takagi and H. Fujita, "Dynamic control and dead-time compensation method of an isolated dual-active-bridge dc-dc converter," in 2015 17th European Conference on Power Electronics and Applications (EPE'15 ECCE-Europe), IEEE, pp. 1-10, 2015.

* cited by examiner

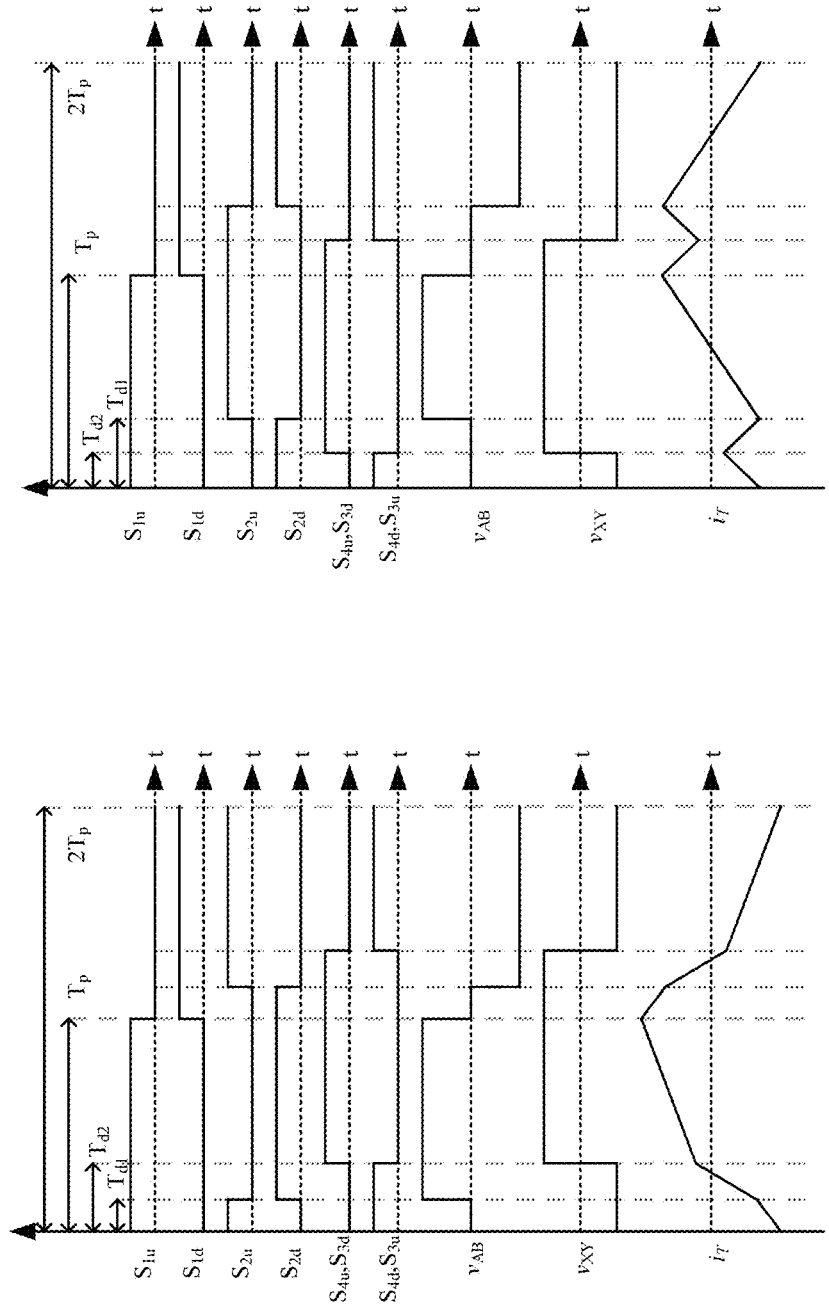

SYSTEM AND METHOD FOR CONTROLLING A CONVERTER CIRCUIT

TECHNICAL FIELD

The present invention relates to a system and method for controlling a converter circuit, and particularly, although not exclusively, to a method for controlling power transition in a dual-active-bridge isolated bidirectional DC-DC converter.

BACKGROUND

Bidirectional DC/DC converters are gaining more attentions due to the recent rapid development in renewable energy harvesting technologies. FIG. 1 shows an exemplary renewable energy system 100. In FIG. 1, the renewable energy system 100 includes different components for harvesting renewable energy. For example, the system includes a wind turbine 102 for harvesting winding energy and a photovoltaic panel 104 for harvesting light energy. In general, these renewable energy has to be converted to a relatively stable DC link voltage before it can be further converted to different DC or AC voltages for use. In the present example, the wind turbine 102 is connected to a DC link 106 through a permanent magnet synchronous generator 108 and an AC-DC converter 110, whilst the photovoltaic panel 104 is connected to the DC link 106 via a DC-DC converter 112. The energy provided by these sources, collected at the DC link 106, will either be used or stored. For example, the energy may be provided through a DC-AC converter 114 to a grid 116 or AC load 118 for use. The energy may also be stored in an energy storage system 120, which includes, for example, a battery stack 122 and a super-capacitor 124, through a DC-DC converter 126. Ideally, the DC-DC converter 126 of the energy storage system 120 allows bi-directional energy transfer between the DC link 106 and the battery stack 122/super-capacitor 124, and can process bidirectional power flow efficiently even under wide variations in power level and/or voltage levels on both sides.

SUMMARY OF THE INVENTION

In accordance with a first aspect of the present invention, there is provided a method for controlling an operation of a converter circuit adapted to regulate power transfer between a first voltage source and a second voltage source, the method comprising the steps of: comparing a detected power value in the converter circuit with a power command value; determining a converter gain based on a detected first voltage level of the first voltage source and a detected second voltage level of the second voltage source; determining operation signals to be transmitted to switches in the converter circuit during a steady state to control switching time and switching duration of the switches; determining values of two or more variables associated with adjustment of switching time and switching duration of the switches based on the detected first and second voltage levels when the detected power value differs from the power command value; and determining operation signals to be transmitted to the switches during a power transition state based on the determined values of the two or more variables to adjust switching time and switching duration of the switches, thereby regulating power transition.

In one embodiment of the first aspect, the power command value is adjustable.

In one embodiment of the first aspect, the step of detecting the first voltage level comprises sampling the first voltage level.

In one embodiment of the first aspect, the step of detecting the second voltage level comprises sampling the second voltage level.

In one embodiment of the first aspect, the switches are semiconductor switches and the operation signals are gating signals of the semiconductor switches.

In one embodiment of the first aspect, the method further comprises generating and transmitting gating signals to the switches during the steady state; and generating and transmitting gating signals to the switches during the power transition state.

In one embodiment of the first aspect, the converter circuit comprises: a first switching circuit in the form of a bridge circuit, the first switching circuit having a first pair of switches and a second pair of switches connected in parallel with each other; a second switching circuit in the form of a bridge circuit, the second switching circuit having a third pair of switches and a fourth pair of switches connected in parallel with each other; and an inductive component coupling the first switching circuit with the second switching circuit; and the method comprises: controlling the first pair of switches, the second pair of switches, the third pair of switches, the fourth pair of switches so that they all have a substantially identical switching period 2Tp during steady state.

In one embodiment of the first aspect, the method further includes, during steady state and power transition state, switching on and off the first pair of switches complementarily; switching on and off the second pair of switches complementarily; switching on and off the third pair of switches complementarily; switching on and off the fourth pair of switches complementarily; switching on and off one of the third pair of switches and one of the fourth pair of switches synchronously; and switching on and off another one of the third pair of switches and another one of the fourth pair of switches synchronously.

In one embodiment of the first aspect, the method further includes, during steady state, switching on and off the first pair of switches complementarily such that each of the first pair of switches has a duty cycle of about 50% with a dead time therebetween; switching on and off the second pair of switches complementarily such that each of the second pair of switches has a duty cycle of about 50% with a dead time therebetween; switching on and off the third pair of switches complementarily such that each of the third pair of switches has a duty cycle of about 50% with a dead time therebetween; switching on and off the fourth pair of switches complementarily such that each of the fourth pair of switches has a duty cycle of about 50% with a dead time therebetween.

In one embodiment of the first aspect, the step of determining operation signals during steady state comprises: determining a first duration $T_{d1}$ from a switch-on time of one of the first pair of switches $s_{1u}$ to a switch-on time of one of the second pair of switches $s_{2d}$; and determining a second duration $T_{d2}$ between the switch-on time of the one of the first pair of switches $s_{1u}$ and a switch-on time of one of the fourth pair of switches $s_{4u}$; wherein $T_p$ is half switching period of the switches, $$D_1 = \frac{T_{d1}}{T_p}, D_2 = \frac{T_{d2}}{T_p}, 0 < D_1 < 1, \text{ and } \frac{D_1 - 1}{2} < D_2 < \frac{D_1 + 1}{2}.$$

In one embodiment of the first aspect, the step of determining operation signals during power transition comprises: controlling a switch-on duration of one of the second pair of switches $s_{2u}$ to $(1+d_1) T_p-T_x$; controlling a switch-on duration of one of the third pair of switches $s_{3u}$ and one of the fourth pair of switches $s_{4d}$ to $(1+d_2) T_p-T_x$; and controlling a switch-on duration of one of the first pair of switches $s_{1u}$ to $T_p-T_x$, wherein $$T_x = \left(d_2 - \frac{d_1}{M}\right) \cdot T_p$$

where $d_1$, $d_2$ are the two or more variables that are determined based on predetermined rules, and M is the converter voltage gain.

In a preferred embodiment of the first aspect, the control of the switch-on durations are applied only once between steady states.

In one embodiment of the first aspect, the converter circuit is a dual active bridge isolated bi-directional DC-DC converter.

In one embodiment of the first aspect, the switches are controlled to regulate one or both of: power transfer from the first voltage source to the second voltage source; and power transfer from the second voltage source to the first voltage source.

In accordance with a second aspect of the present invention, there is provided a controller for controlling operation of a converter circuit adapted to regulate power transfer between a first voltage source and a second voltage source, the controller comprises: means for comparing a detected power value in the converter circuit with a power command value; means for determining a converter gain based on a detected first voltage level of the first voltage source and a detected second voltage level of the second voltage source; means for determining operation signals to be transmitted to switches in the converter circuit during a steady state to control switching time and switching duration of the switches; means for determining values of two or more variables associated with adjustment of switching time and switching duration of the switches based on the detected first and second voltage levels when the detected power value differs from the power command value; and means for determining operation signals to be transmitted to the switches during a power transition state based on the determined values of the two or more variables to adjust switching time and switching duration of the switches, thereby regulating power transition.

In one embodiment of the second aspect, the controller further includes means for sampling the first voltage level; and/or means for sampling the second voltage level.

In one embodiment of the second aspect, the controller further includes means for generating and transmitting operation signals in the form of gating signals to the switches during the steady state; and means for generating and transmitting operation signals in the form of gating signals to the switches during the power transition state.

In one embodiment of the second aspect, the controller further includes means for switching on and off a first pair of switches of the converter circuit complementarily; means for switching on and off a second pair of switches of the converter circuit complementarily; means for switching on and off a third pair of switches of the converter circuit complementarily; means for switching on and off a fourth pair of switches of the converter circuit complementarily; means for switching on and off one of the third pair of switches and one of the fourth pair of switches synchronously; and means for switching on and off another one of the third pair of switches and another one of the fourth pair of switches synchronously.

In one embodiment of the second aspect, the controller further includes means for switching on and off the first pair of switches complementarily during steady state such that each of the first pair of switches has a duty cycle of about 50% with a dead time therebetween; means for switching on and off the second pair of switches complementarily during steady state such that each of the second pair of switches has a duty cycle of about 50% with a dead time therebetween; means for switching on and off the third pair of switches complementarily during steady state such that each of the third pair of switches has a duty cycle of about 50% with a dead time therebetween; means for switching on and off the fourth pair of switches complementarily during steady state such that each of the fourth pair of switches has a duty cycle of about 50% with a dead time therebetween.

In one embodiment of the second aspect, the controller further includes means for determining, during steady state, a first duration $T_{d1}$ from a switch-on time of one of the first pair of switches $s_{1u}$ to a switch-on time of one of the second pair of switches $s_{2d}$; means for determining, during steady state, a second duration $T_{d2}$ between the switch-on time of the one of the first pair of switches $s_{1u}$ and a switch-on time of one of the fourth pair of switches $s_{4u}$; means for controlling, during power transition state, a switch-on duration of one of the second pair of switches $s_{2u}$ to $(1+d_1) T_p-T_x$; means for controlling, during power transition state, a switch-on duration of one of the third pair of switches $s_{3u}$ and one of the fourth pair of switches $s_{4d}$ to $(1+d_2) T_p-T_x$; and means for controlling, during power transition state, a switch-on duration of one of the first pair of switches $s_{1u}$ to $T_p-T_x$, wherein $T_p$ is half switching period of the switches, $$D_1 = \frac{T_{d1}}{T_p}, D_2 = \frac{T_{d2}}{T_p}, 0 < D_1 < 1, \text{ and } \frac{D_1 - 1}{2} < D_2 < \frac{D_1 + 1}{2};$$

and wherein $$T_x = \left(d_2 - \frac{d_1}{M}\right) \cdot T_p$$

where $d_1$, $d_2$ are the two or more variables that are determined based on predetermined rules, and M is the converter voltage gain.

In one embodiment of the second aspect, the controller may be a microcontroller, an MCU, a CPU, etc., including processing and memory modules. In other embodiments, the controller may be other information handling systems such as computers.

In accordance with a third aspect of the present invention, there is provided a non-transient computer readable medium for storing computer instructions that, when executed by one or more processors, causes the one or more processors to perform a method for controlling an operation of a converter circuit adapted to regulate power transfer between a first voltage source and a second voltage source, the method comprising the steps of: comparing a detected power value in the converter circuit with a power command value; determining a converter gain based on a detected first voltage level of the first voltage source and a detected second voltage level of the second voltage source; determining operation signals to be transmitted to switches in the converter circuit during a steady state to control switching time and switching duration of the switches; determining values of two or more variables associated with adjustment of switching time and switching duration of the switches based on the detected first and second voltage levels when the detected power value differs from the power command value; and determining operation signals to be transmitted to the switches during a power transition state based on the determined values of the two or more variables to adjust switching time and switching duration of the switches, thereby regulating power transition.

BRIEF DESCRIPTION OF THE DRAWINGS

Embodiments of the present invention will now be described, by way of example, with reference to the accompanying drawings in which:

FIG. 3A is a plot showing steady state waveforms of the converter circuit of FIG. 2 in a first mode of operation $A^+$ when power is transferred from $V_1$ to $V_2$;

FIG. 3B is a plot showing steady state waveforms of the converter circuit of FIG. 2 in a second mode of operation $B^+$ when power is transferred from $V_1$ to $V_2$;

DETAILED DESCRIPTION OF THE PREFERRED EMBODIMENT

Figure 1:
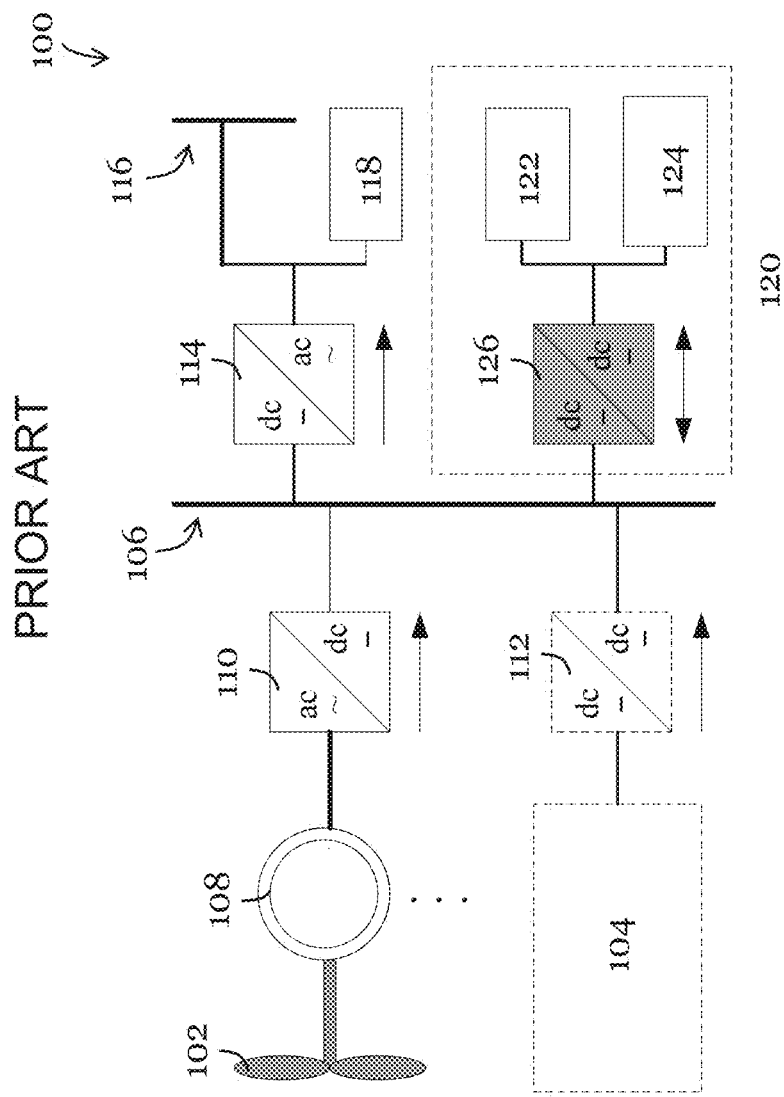
FIG. 1 is a schematic diagram of an exemplary renewable energy system.
Figure 2:
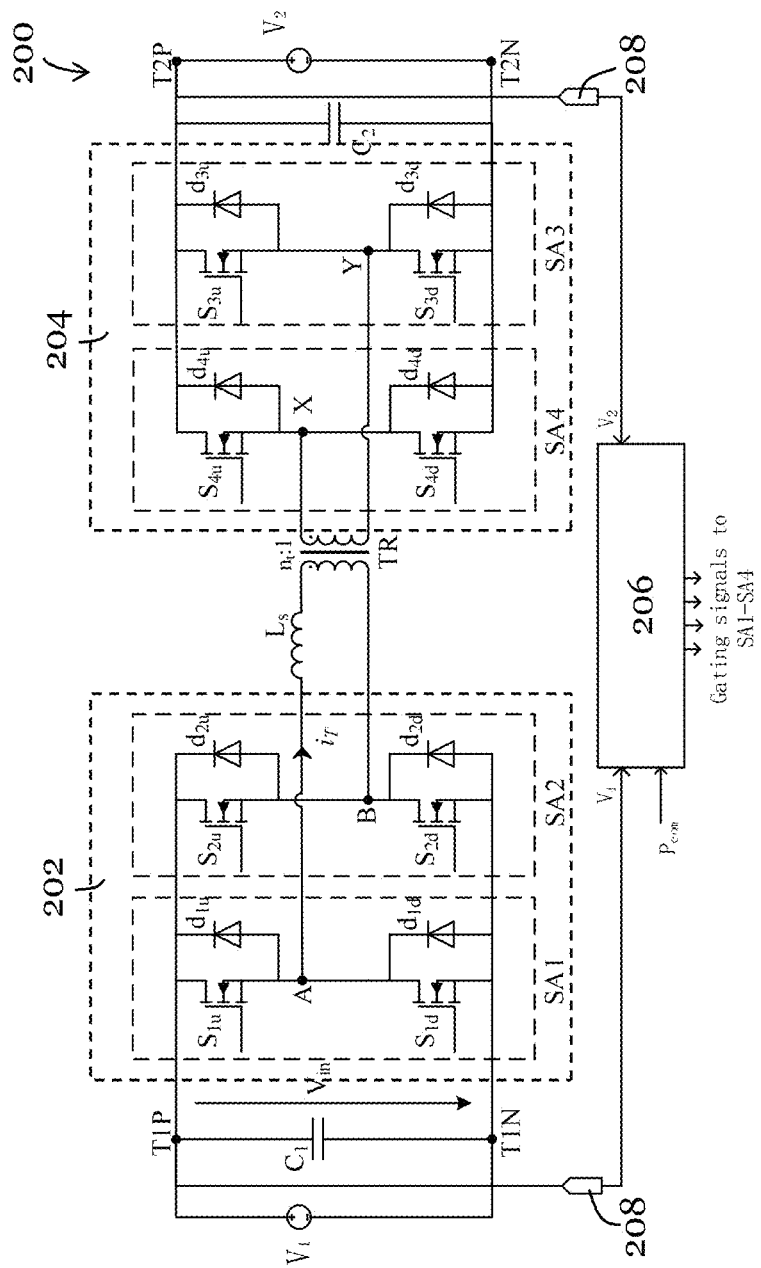
FIG. 2 is a circuit diagram of a converter circuit in accordance with one embodiment of the present invention.

Referring now to FIG. 2, there is illustrated a converter circuit 200 in accordance with one embodiment of the present invention. In the present embodiment, the converter circuit 200 is a dual-active-bridge isolated bidirectional DC-DC converter circuit. The circuit 200 is arranged between a first voltage source $V_1$ and a second voltage source $V_2$ for regulating power transfer between them. Preferably, the first and second voltage sources $V_1$ and $V_2$ are both DC voltage sources, and the circuit 200 is operable to regulate bi-directional power flow between the two sources $V_1$ and $V_2$. In one embodiment, the first voltage source $V_1$ is at a higher voltage compared with that of the second voltage source $V_2$. Also, the first and second voltage sources $V_1$ and $V_2$ may have a large voltage variation range. A first filter circuit may be electrically connected across the first voltage source, and a second filter circuit may be electrically connected across the second voltage source. In the present embodiment, the first filter circuit is a low pass filter formed by a capacitor $C_1$ connected across nodes T1P and T1N, and the second filter circuit is a low pass filter formed by a capacitor $C_2$ connected across nodes T2P and T2N. Preferably, nodes T1P and T2P are at a higher potential compared to that of nodes T1N and T2N respectively.

As shown in FIG. 2, the converter circuit 200 includes a first switching circuit 202 and a second switching circuit 204 both in the form of a bridge circuit. The first switching circuit 202 includes a first pair of switches SA1 and a second pair of switches SA2 connected in parallel with each other, across nodes T1P and T1N. The first pair of switches SA1 may include a first switch $s_{1u}$ and a second switch $s_{1d}$ connected in series. A first switch node A may be defined between the first switch $s_{1u}$ and the second switch $s_{1d}$. The second pair of switches SA2 may include a third switch $s_{2u}$ and a fourth switch $s_{2d}$ connected in series. A second switch node B may be defined between the third switch $s_{2u}$ and the fourth switch $s_{2d}$. The second switching circuit 204 includes a third pair of switches SA3 and a fourth pair of switches SA4 connected in parallel with each other, across nodes T2P and T2N. The third pair of switches SA3 may include a fifth switch $s_{3u}$ and a sixth switch $s_{3d}$ connected in series. A third switch node N may be defined between the fifth switch $s_{3u}$ and the sixth switch $s_{3d}$. The fourth pair of switches SA4 may include a seventh switch $s_{4u}$ and an eighth switch $s_{4d}$ connected in series. A fourth switch node M may be defined between the seventh switch $s_{4u}$ and the eighth switch $s_{4d}$. In a preferred embodiment, the switches $s_{1u}$, $s_{1d}$, $s_{2u}$, $s_{2d}$, $s_{3u}$, $s_{3d}$, $s_{4u}$, $s_{4d}$ are semiconductor switches which may be, for example, a MOSFET. Preferably, the semiconductor switches may each be connected with a parallel, body/bypass diode $d_{1u}$, $d_{1d}$, $d_{2u}$, $d_{2d}$, $d_{3u}$, $d_{3d}$, $d_{4u}$, $d_{4d}$. The switches $s_{1u}$, $s_{1d}$, $s_{2u}$, $s_{2d}$, $s_{3u}$, $s_{3d}$, $s_{4u}$, $s_{4d}$ in the present embodiment may have a substantially identical switching period $2T_p$, although they need not be switched on and/or off at the same time.

The converter circuit 200 further includes an inductive component connected between the first switching circuit 202 and the second switching circuit 204 for electrically coupling the two. In the present embodiment, the inductive component includes a transformer TR with a primary winding connected in series between the first switch node A and the second switch node B of the first switching circuit 202, and a secondary winding connected in series between the third switch node N and the fourth switch node M of the second switching circuit 204. The transformer TR is operable to provide galvanic isolation between the first and second switching circuits 202 and 204. The turn ratio of the transformer TR can be designed to meet the requirements of different converter voltage ratios. A power inductor $L_s$ may be connected between the primary coil of the transformer TR and node A.

FIG. 2 also shows a controller 206 of the converter circuit 200. In one example, the controller 206 is a microcontroller. The controller may alternatively be formed by one or more CPU, MCU, etc. The controller 206 is arranged to control an operation of the converter circuit 200, and particularly the operation of the switches $s_{1u}$, $s_{1d}$, $s_{2u}$, $s_{2d}$, $s_{3u}$, $s_{3d}$, $s_{4u}$, $s_{4d}$, so as to regulate bi-directional power transfer between the first voltage source $V_1$ and the second voltage source $V_2$, in particular during power transition from one operation mode to another. In the present embodiment, the controller 206 is coupled with voltage detectors 208 connected to nodes T1P and T2P for detecting a voltage level of the first voltage source $V_1$ and a voltage level of the second voltage source $V_2$. The voltage detectors 208 may perform voltage detection by sampling the voltage value of the first and second voltage sources $V_1$ and $V_2$ at regular or random time intervals. Alternatively, the voltage detectors 208 may continuously monitor the voltage levels of the first and second voltage sources $V_1$ and $V_2$.

In the present invention, the controller 206 is operable to determine a power value of the converter circuit, e.g., based on the detected first and second voltage levels, and to compare the determined power value with a power command value $P_{com}$. The power command value $P_{com}$ may be predetermined, or may be dynamically adjustable during operation. In one embodiment, the controller 206 is operable to receive a power command value $P_{com}$ from, for example, an operator operating the controller. The controller 206 is also operable to determine a switching time (switch-on time or switch-off time, and hence switching duration) of one or more of the switches $s_{1u}$, $s_{1d}$, $s_{2u}$, $s_{2d}$, $s_{3u}$, $s_{3d}$, $s_{4u}$, $s_{4d}$ in the converter circuit 200 based on a compared result of the power values. Based on the determined switching time, the controller 206 may then generate and provide gating signals to the one or more switches $s_{1u}$, $s_{1d}$, $s_{2u}$, $s_{2d}$, $s_{3u}$, $s_{3d}$, $s_{4u}$, $s_{4d}$ to control their operation. The gating signals may be PWM signals. In the present example, the controller 206 is connected with the gate terminal of the MOSFET switches $s_{1u}$, $s_{1d}$, $s_{2u}$, $s_{2d}$, $s_{3u}$, $s_{3d}$, $s_{4u}$, $s_{4d}$ to output gating signals to the MOSFET switches.

In the present embodiment, the controller 206 is arranged control the switches $s_{1u}$, $s_{1d}$, $s_{2u}$, $s_{2d}$, $s_{3u}$, $s_{3d}$, $s_{4u}$, $s_{4d}$ such that all of them have a substantially identical switching period $2T_p$. The switching period $2T_p$, which is preferably fixed, may be defined as a duration between successive switch-on times of the first switch $s_{1u}$. Preferably, the controller 206 switches on and off the first pair of switches SA1 complementarily (switches on the first switch $s_{1u}$ and switches off the second switch $s_{1d}$ at the same time) such that each of the first switch $s_{1u}$ and the second switch $s_{1d}$ has a duty cycle of about 50% with a dead time therebetween. Preferably, the controller 206 also switches on and off each of the second pair of switches SA2, the third pair of switches SA3, and/or the fourth pair of switches SA4 complementarily such that these switches $s_{2u}$, $s_{2d}$, $s_{3u}$, $s_{3d}$, $s_{4u}$, $s_{4d}$ have a respective duty cycle of about 50% with a dead time therebetween. In a preferred embodiment, the controller 206 also switches on and off one of the third pair of switches SA3 (e.g., the sixth switch $s_{3d}$) and one of the fourth pair of switches SA4 (e.g., the seventh switch $s_{4u}$) synchronously, and switches on and off another one of the third pair of switches SA3 (e.g., the fifth switch $s_{3u}$) and another one of the fourth pair of switches SA4 (e.g., the eighth switch $s_{4d}$) synchronously. The controller 206 in the present embodiment can also determine a first duration $T_{d1}$ between a switch-on time of one of the first pair of switches SA1 (e.g., the first switch $s_{1u}$) and a switch-on time of one of the second pair of switches SA2 (e.g. the fourth switch $s_{2d}$); and a second duration $T_{d2}$ between the switch-on time of the one of the first pair of switches SA1 (e.g., the first switch $s_{1u}$) and a switch-on time of one of the fourth pair of switches SA4 (e.g., the seventh switch $s_{4u}$), based on one or more predetermined equations or relationships. The first duration $T_{d1}$ may be positive or negative. The second duration $T_{d2}$ may be positive or negative. In the present example, the first and second durations are defined as:

$$D_1 = \frac{T_{d1}}{T_p} \quad (1)$$

$$D_2 = \frac{T_{d2}}{T_p} \quad (2)$$

where $0 < D_1 < 1$ and $\frac{D_1 - 1}{2} < D_2 < \frac{D_1 + 1}{2}$.

FIGS. 3A and 3B illustrate steady state waveforms of the converter circuit of FIG. 2 in a first mode of operation $A^+$ and second mode of operation $B^+$ respectively when power is transferred from the first voltage source $V_1$ to the second voltage source $V_2$.

For FIG. 3A, the net power transferred from the first voltage source $V_1$ to the second voltage source $V_2$ is:

$$P = \frac{n_t V_1 V_2}{4fL_s}(-D_1^2 - 2D_2^2 + 2D_1 D_2 - D_1 + 2D_2) \text{ when} \quad (3)$$

$$D_1 \leq D_2 \leq (D_1 + 1)/2$$

For FIG. 3B, the net power transferred from the first voltage source $V_1$ to the second voltage source $V_2$ is:

$$P = \frac{n_t V_1 V_2}{4fL_s}(D_1^2 - 2D_1 D_2 - D_1 + 2D_2) \text{ when} \quad (4)$$

$$D_1/2 \leq D_2 \leq D_1$$

Figure 3D:
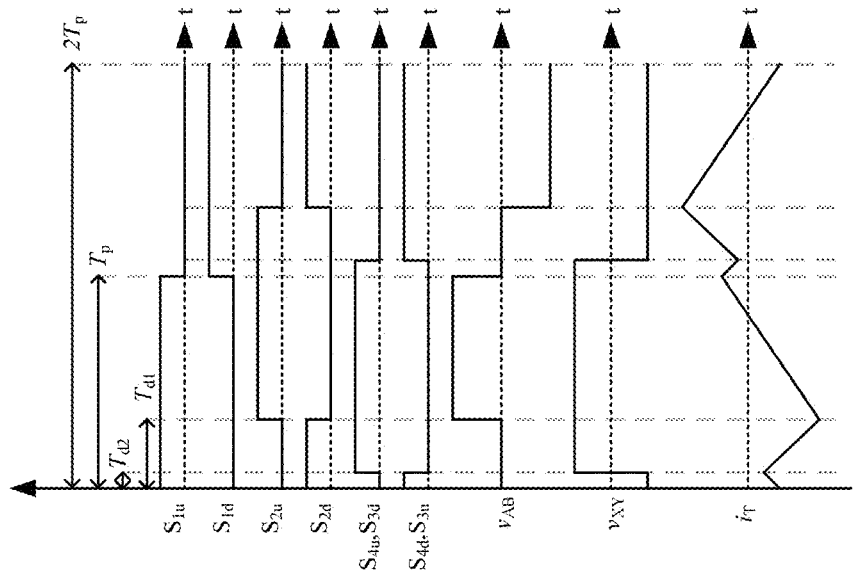
FIG. 3D is a plot showing steady state waveforms of the converter circuit of FIG. 2 in a fourth mode of operation $B^-$ when power is transferred from $V_2$ to $V_1$.
Figure 3C:
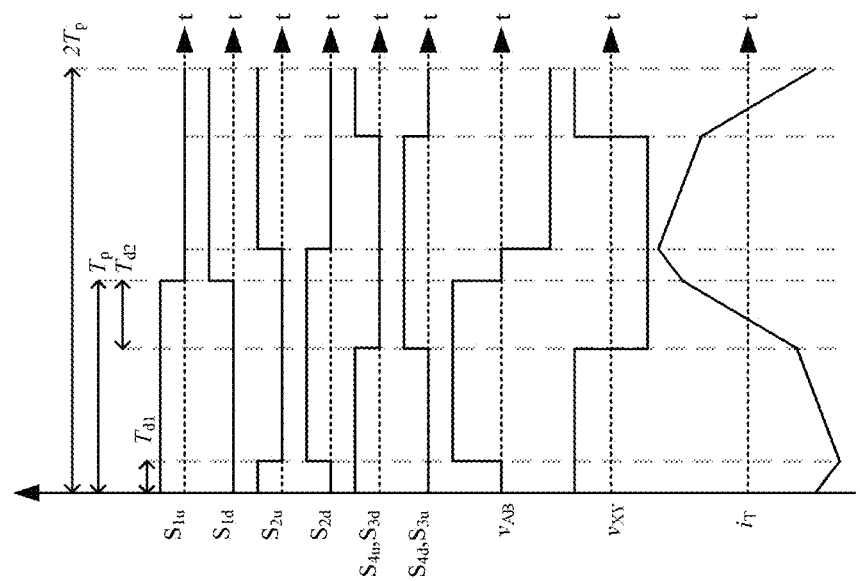
FIG. 3C is a plot showing steady state waveforms of the converter circuit of FIG. 2 in a third mode of operation $A^-$ when power is transferred from $V_2$ to $V_1$.

FIGS. 3C and 3D illustrate steady state waveforms of the converter circuit of FIG. 2 in a first mode of operation $A^-$ and second mode of operation $B^-$ respectively when power is transferred from the second voltage source $V_2$ to the first voltage source $V_1$.

For FIG. 3C, the net power transferred from the second voltage source $V_2$ to the first voltage source $V_1$ is:

$$P = \frac{n_t V_1 V_2}{4fL_s}(-D_1^2 - 2D_2^2 + 2D_1 D_2 - D_1 + 2D_2) \text{ when} \quad (5)$$

$$(D_1 - 1)/2 \leq D_2 \leq 0$$

For FIG. 3D, the net power transferred from the second voltage source $V_2$ to the first voltage source $V_1$ is:

$$P = \frac{n_t V_1 V_2}{4fL_s}(D_1^2 - 2D_1 D_2 - D_1 + 2D_2) \text{ When} \quad (6)$$

$$0 \leq D_2 \leq D_1/2$$

Figure 4A:
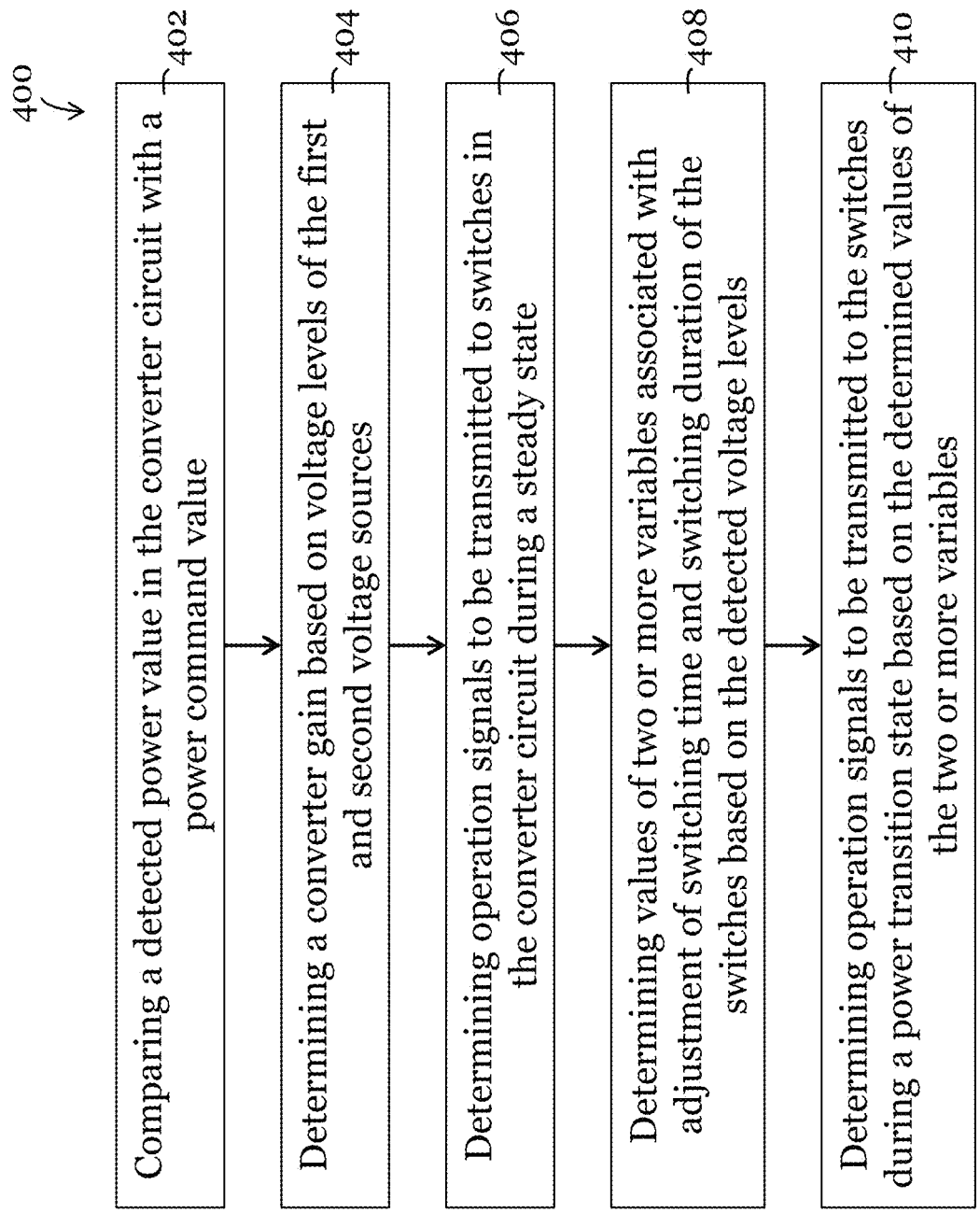
FIG. 4A is a block diagram illustrating a method for controlling operation of the converter circuit of FIG. 2.

FIG. 4A shows the general method 400 for controlling operation of a converter circuit such as the one 200 illustrated in FIG. 2. It should be noted that the order of the method steps in method 400 may be different in different embodiments. To better illustrate the invention, in the following description references will be made to the structure of converter 200. The method begins in step 402, in which a detected power value in the converter circuit 200 is compared with a power command value $P_{com}$. In step 404, a converter gain is determined based on detected voltage levels of the first and second voltage sources. During steady state operation (i.e., no power mode transition), the method 400 proceeds to step 406 and determines operation signals, e.g., gating signals, to be transmitted to switches $s_{1u}$, $s_{1d}$, $s_{2u}$, $s_{2d}$, $s_{3u}$, $s_{3d}$, $s_{4u}$, $s_{4d}$ in the converter circuit 200. In step 408, when it is determined that a power transition occurs, as indicated by a difference between the detected power value and the power command value $P_{com}$, the method proceeds to determine values of two or more variables associated with adjustment of switching time and switching duration $S_{1d})_{52u}$, of the switches $s_{1u}$, $s_{2d}$, $s_{2u}$, $s_{2d}$, $s_{3u}$, $s_{3d}$, $s_{4u}$, $s_{4d}$ based on the detected voltage levels $V_1$ and $V_2$. In step 410, the method then determines operation signals to be transmitted to the switches $s_{1u}$, $s_{1d}$, $s_{2u}$, $s_{2d}$, $s_{3u}$, $s_{3d}$, $s_{4u}$, $s_{4d}$ during a power transition state based on the determined values of the two or more variables, to facilitate smooth power transition. In a preferred embodiment, the method 400 is performed by the controller 206.

In the present embodiment, when the transferred power is changed, $D_1$ and $D_2$ has to be changed to $D_1+d_1$ and $D_2+d_2$ respectively. Preferably, a pre-set strategy is adopted to determine the values of $d_1$ and $d_2$. The method in the present embodiment is mainly arranged to implement the adjustment of gating signals so that there is no disturbance to the current $i_T$ in the converter during power transition between modes. Preferably, an unknown time duration $T_x$ is to be assigned to the gating signal of the first switch $S_{1u}$, and gating signals of other switches will be adjusted consequently to realize the required adjustment of $d_1$, $d_2$. $T_x$ might be either positive or negative.

In a preferred embodiment, in the duration starting from the turn-off moment of switch $S_u$, to the next turn-off moment of switch $S_{1u}$, the following commands will be executed (a) The on-period of $S_{2u}$ is changed to $(1+d_1) T_p-T_x$
(b) The on-period of $S_{3u}$, $S_{4d}$ is changed to $(1+d_2) T_p-T_x$
(c) The on-period of $S_{1u}$ is changed to $T_p-T_x$ Except for commands (a)-(c), all other switches are operated at substantially 50% duty cycle with on-duration equal to $T_p$. After those execution, the power level change from P ($D_1$, $D_2$) to $P(D_1+d_1, D_2+d_2)$ and no disturbances will be observed.

In the present embodiment, the inserted $T_x$ is determined by the formula:

$$T_x = x \cdot T_p; x = \left(d_2 - \frac{d_1}{M}\right) \quad (7)$$

wherein the converter voltage gain is defined as $$M = n_t \cdot \frac{V_2}{V_1},$$

$V_2$ is the voltage value of the second voltage source, $V_1$ is the voltage value of the first voltage source, $n_t$ is the turn ratio of the primary winding to the secondary winding in transformer TR.

Figure 4B:
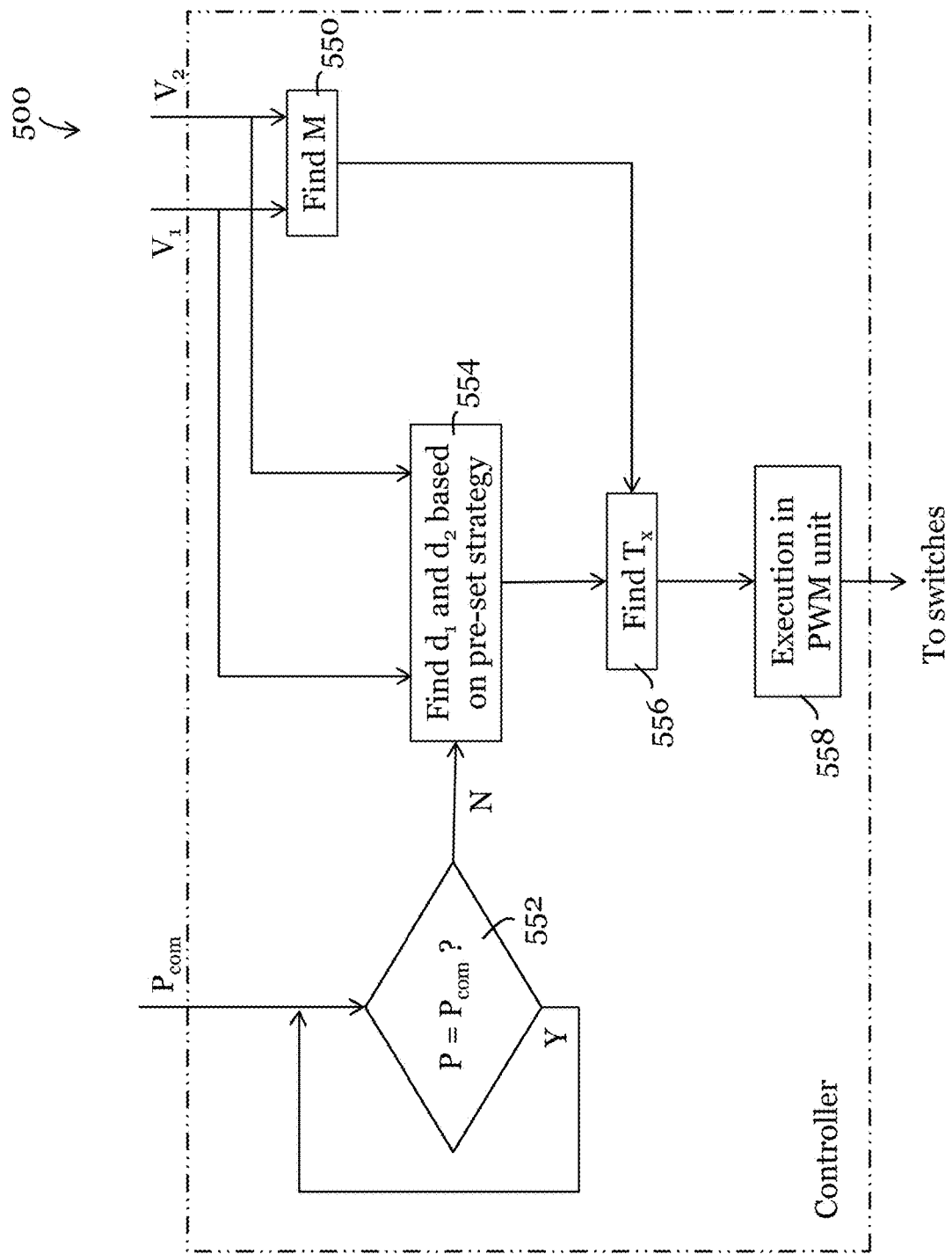
FIG. 4B is a block diagram illustrating a specific implementation of the method of FIG. 4A.

FIG. 4B shows a flow chart of a specific implementation 500 of the control method of FIG. 4A. In FIG. 4B, the method 500 includes, in step 550 detecting the voltage values of the two voltage source voltages $V_1$ and $V_2$ to calculate the converter gain M. In step 552, the received power command $P_{com}$ is compared with current power in the converter. If they are same, no action is taken. If they are not same, then in step 554, an increment of $D_1$, $D_2$ (i.e. $d_1$, $d_2$) will be determined by the pre-set strategy. By determining M, the values of x and $T_x$ can be determined in step 556 based on equation (7). In step 558, the PWM unit can use the x and $T_x$ values to adjust the gating signals for controlling the switches $s_{1u}$, $s_{1d}$, $s_{2u}$, $s_{2d}$, $s_{3u}$, $s_{3d}$, $s_{4u}$, $s_{4d}$ so during power transition.

In the present embodiment, the control method in FIGS. 4A and 4B is applicable to all possible load adjustments between any two modes of A+, B+, A−, B−. These case are listed in Table I.

TABLE I

| Initial | A+ | A+ | A+ | A+ | B+ | B+ | B+ | B+ | A− | A− | A− | A− | B− | B− | B− | B− |
|---|---|---|---|---|---|---|---|---|---|---|---|---|---|---|---|---|
| Final | A+ | B+ | A− | B− | A+ | B+ | A− | B− | A+ | B+ | A− | B− | A+ | B+ | A− | B− |

Figure 5:
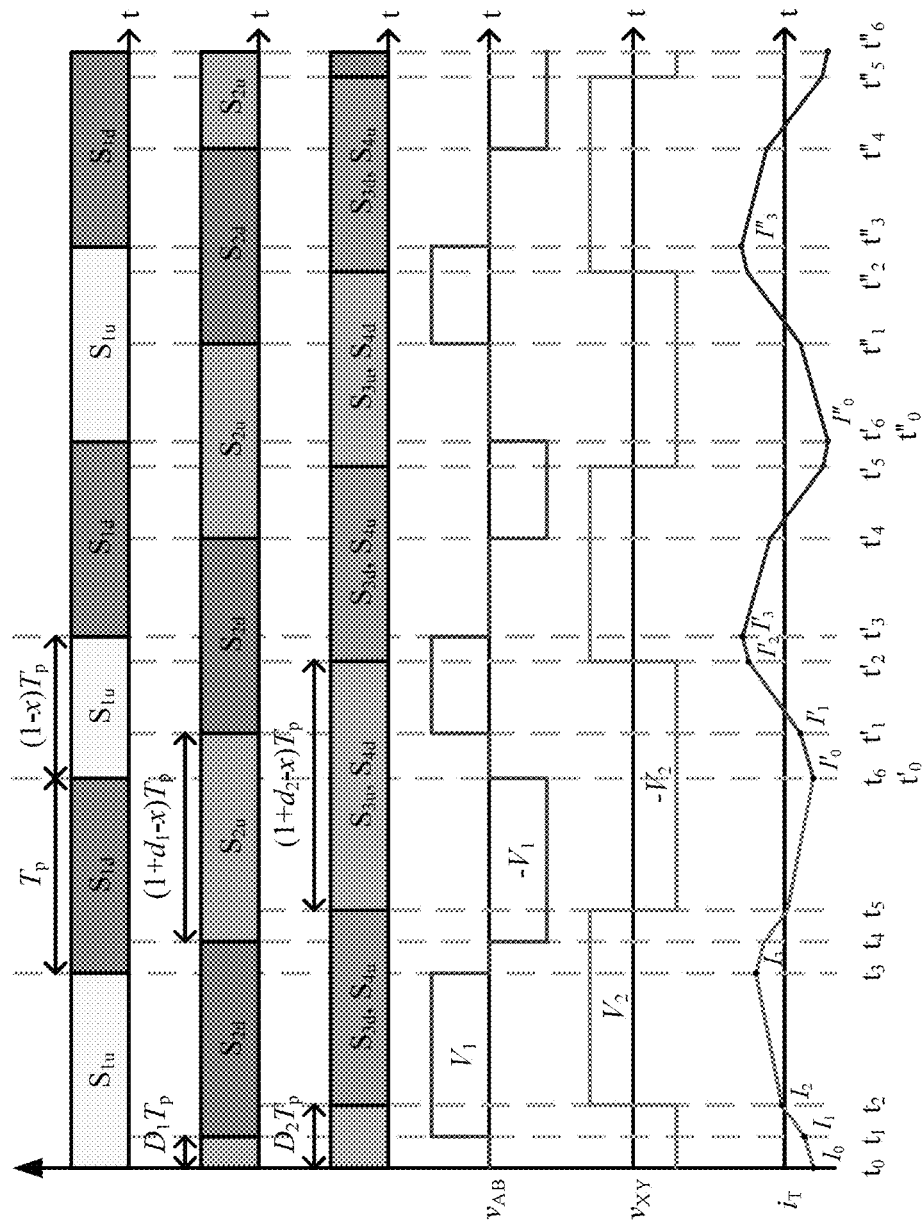
FIG. 5 is a plot showing waveforms of the converter circuit of FIG. 2 when transiting from mode $A^+$ to mode $A^+$.

FIG. 5 shows waveforms of the converter circuit of FIG. 2 during power transition from Mode A+ to A+ using the method FIGS. 4A and 4B. In FIG. 5, the converter is in an initial state before $t_o'$ and is in the final state after $t_3'$, although the change in switching time and duration of the switches $S_{1u}$, $S_{2u}$, $S_{3u}$, $S_{4d}$ carries through the whole period from $t_3$ to $t_3'$.

Figure 6:
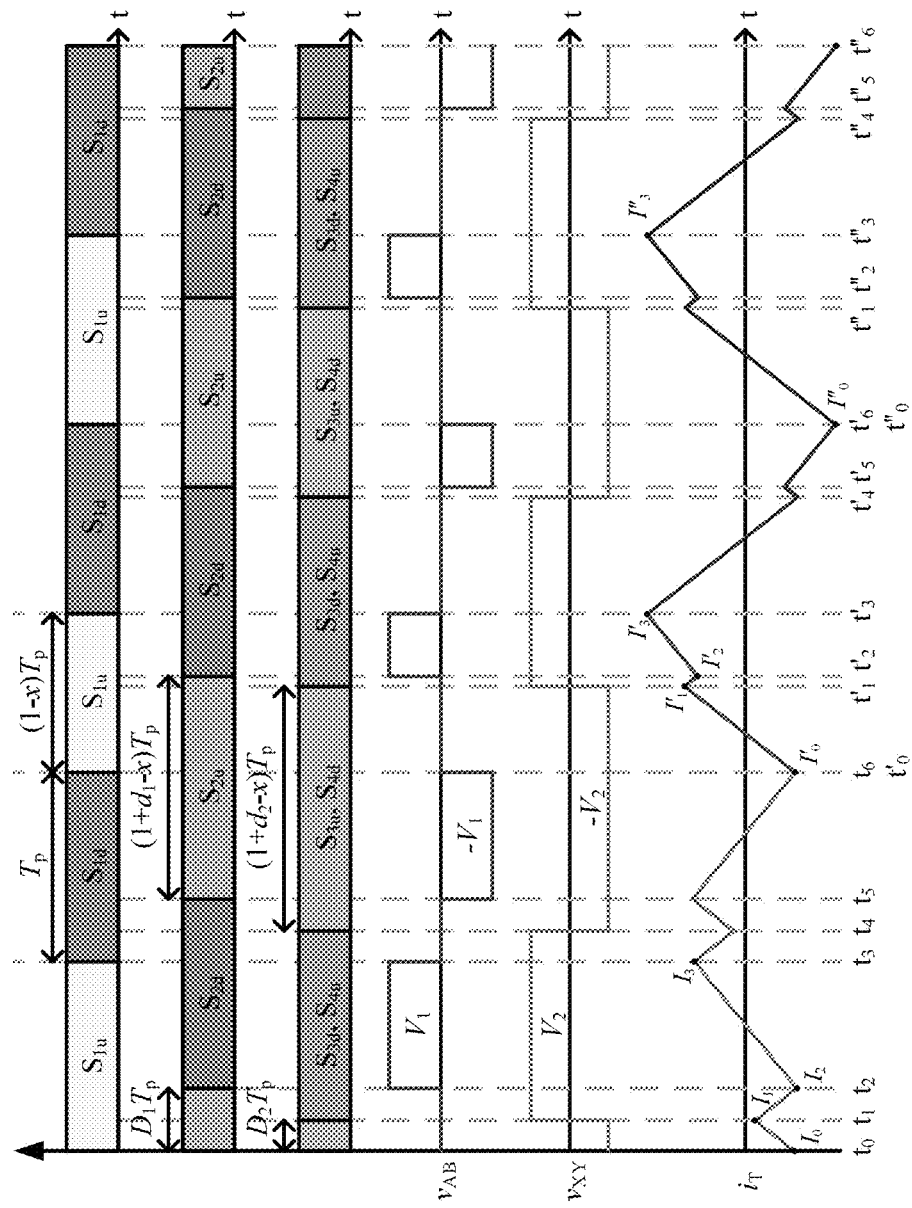
FIG. 6 is a plot showing waveforms of the converter circuit of FIG. 2 when transiting from mode $B^+$ to mode $B^+$.

FIG. 6 shows waveforms of the converter circuit of FIG. 2 during power transition from Mode B+ to B+ using the method FIGS. 4A and 4B. In FIG. 6, the converter is in an initial state before $t_o'$ and is in the final state after $t_3'$, although the change in switching time and duration of the switches $S_{1u}$, $S_{2u}$, $S_{3u}$, $S_{4d}$ carries through the whole period from $t_3$ to $t_3'$.

Figure 7:
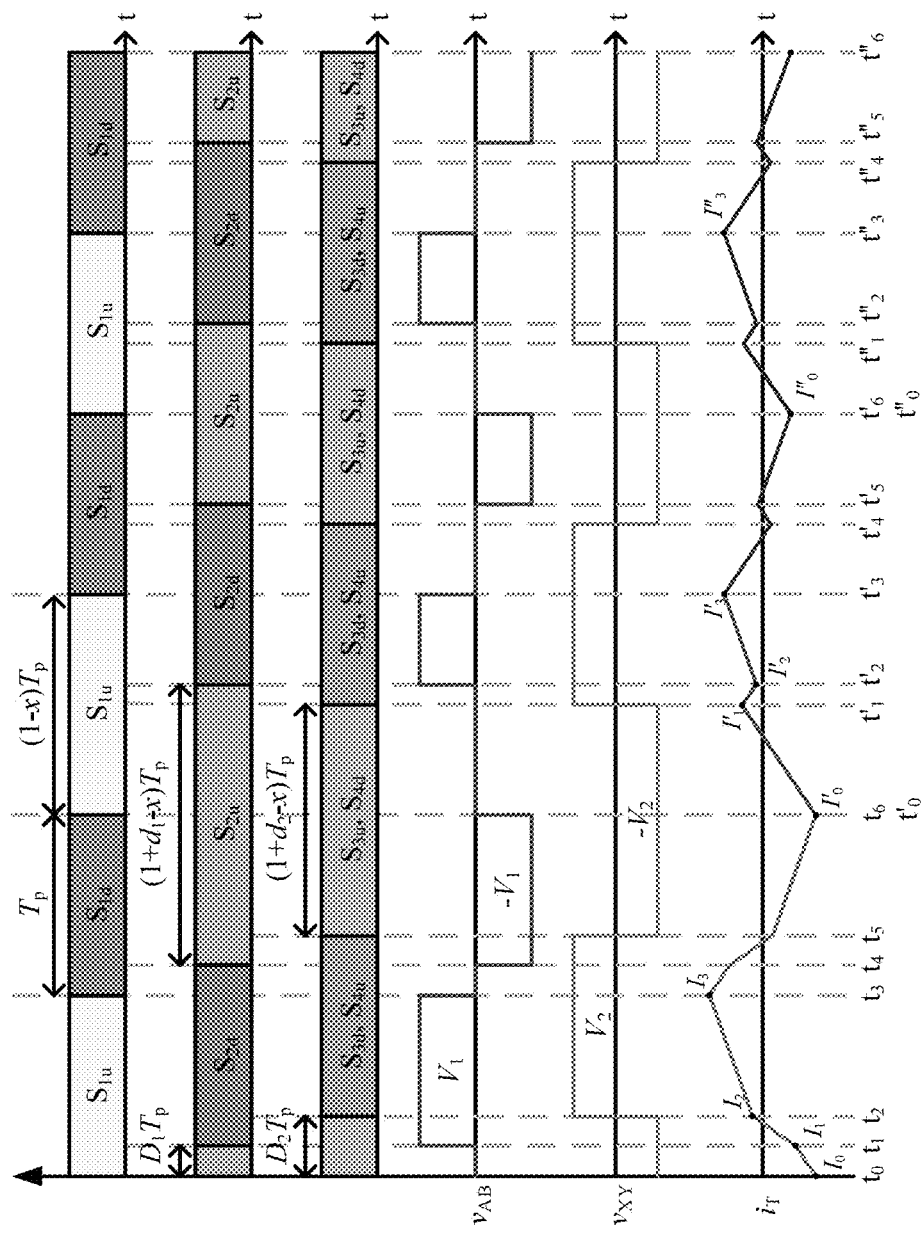
FIG. 7 is a plot showing waveforms of the converter circuit of FIG. 2 when transiting from mode $A^+$ to mode $B^+$.

FIG. 7 shows waveforms of the converter circuit of FIG. 2 during power transition from Mode A+ to B+ using the method FIGS. 4A and 4B. In FIG. 7, the converter is in an initial state before $t_o'$ and is in the final state after $t_3'$, although the change in switching time and duration of the switches $S_{1u}$, $S_{2u}$, $S_{3u}$, $S_{4d}$ carries through the whole period from $t_3$ to $t_3'$.

Figure 8:
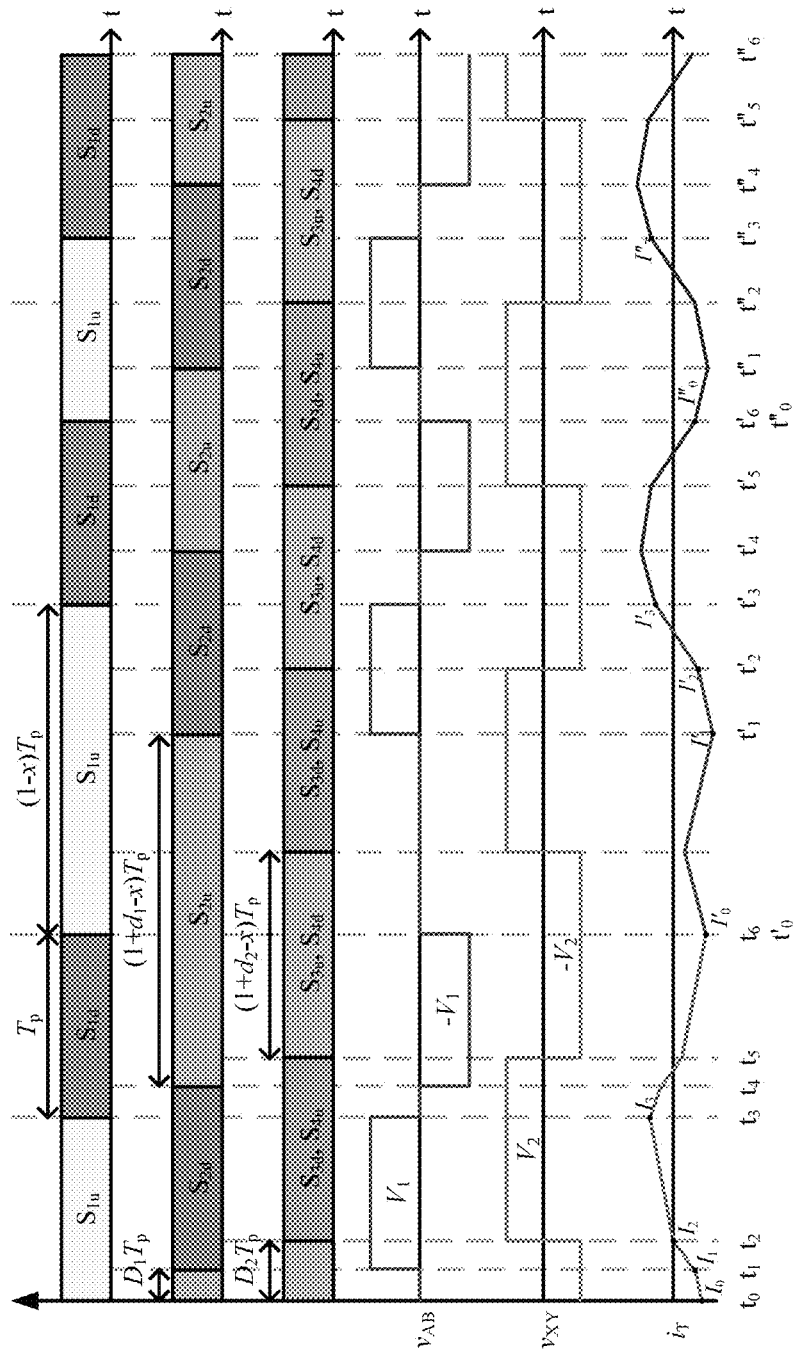
FIG. 8 is a plot showing waveforms of the converter circuit of FIG. 2 when transiting from mode $A^+$ to mode $A^-$.

FIG. 8 shows waveforms of the converter circuit of FIG. 2 during power transition from Mode A+ to A− using the method FIGS. 4A and 4B. In FIG. 8, the converter is in an initial state before $t_o'$ and is in the final state after $t_3'$, although the change in switching time and duration of the switches $S_{1u}$, $S_{2u}$, $S_{3u}$, $S_{4d}$ carries through the whole period from $t_3$ to $t_3'$.

Figure 9:
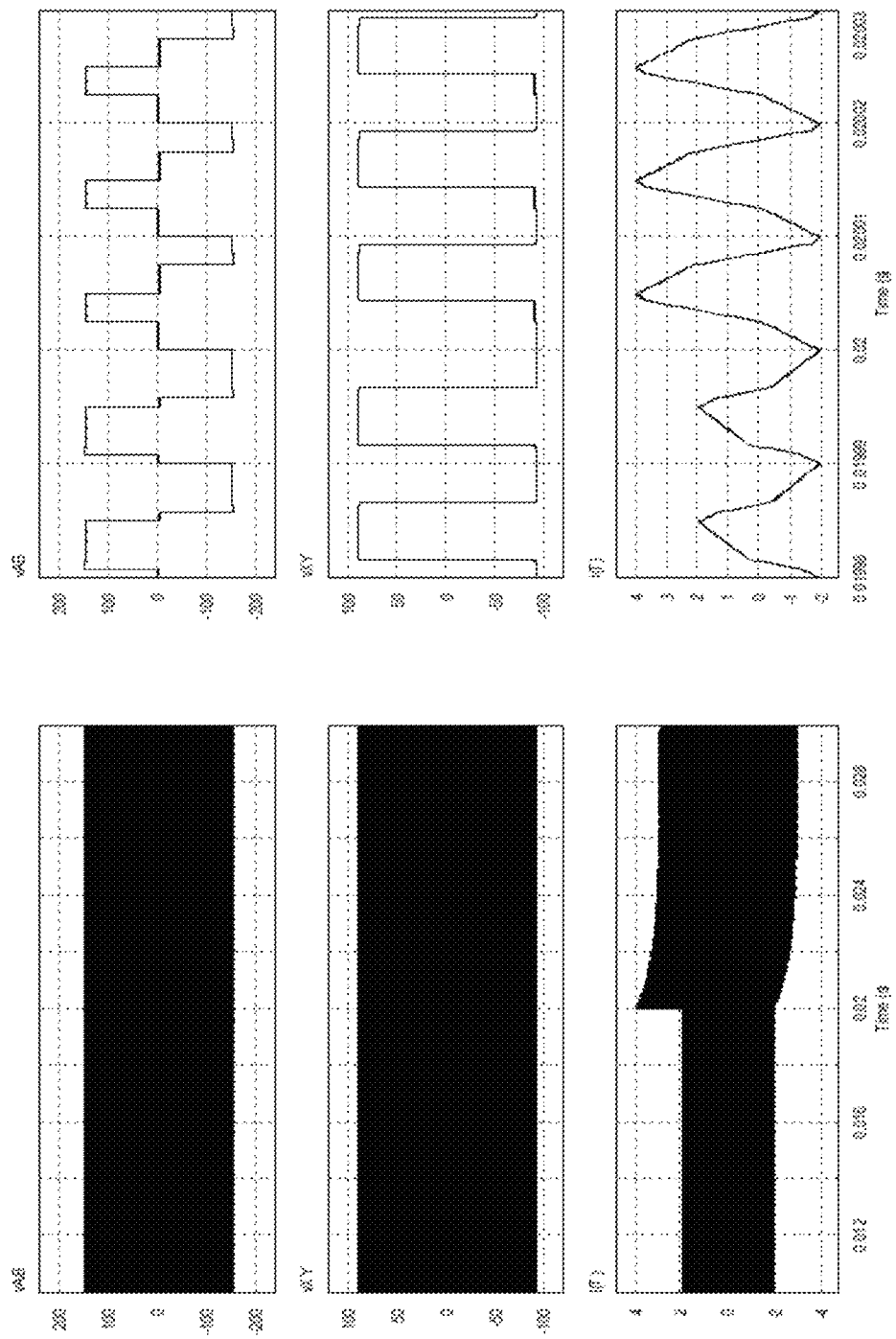
FIG. 9 are graphs showing simulated waveforms in the converter circuit of FIG. 2 when transiting from mode $A^+$ to mode $A^+$ without using the method of FIGS. 4A and 4B.

FIG. 9 shows simulation results of waveforms in the converter 200 during power transition when transiting from mode A$^+$ to mode A$^+$ without using the method of FIG. 4B. It can be seen there is an abnormal peak current arising during the transition. Also, the current during transition is no longer symmetric by x-axis, which indicates that a non-zero dc bias current is present.

Figure 10:
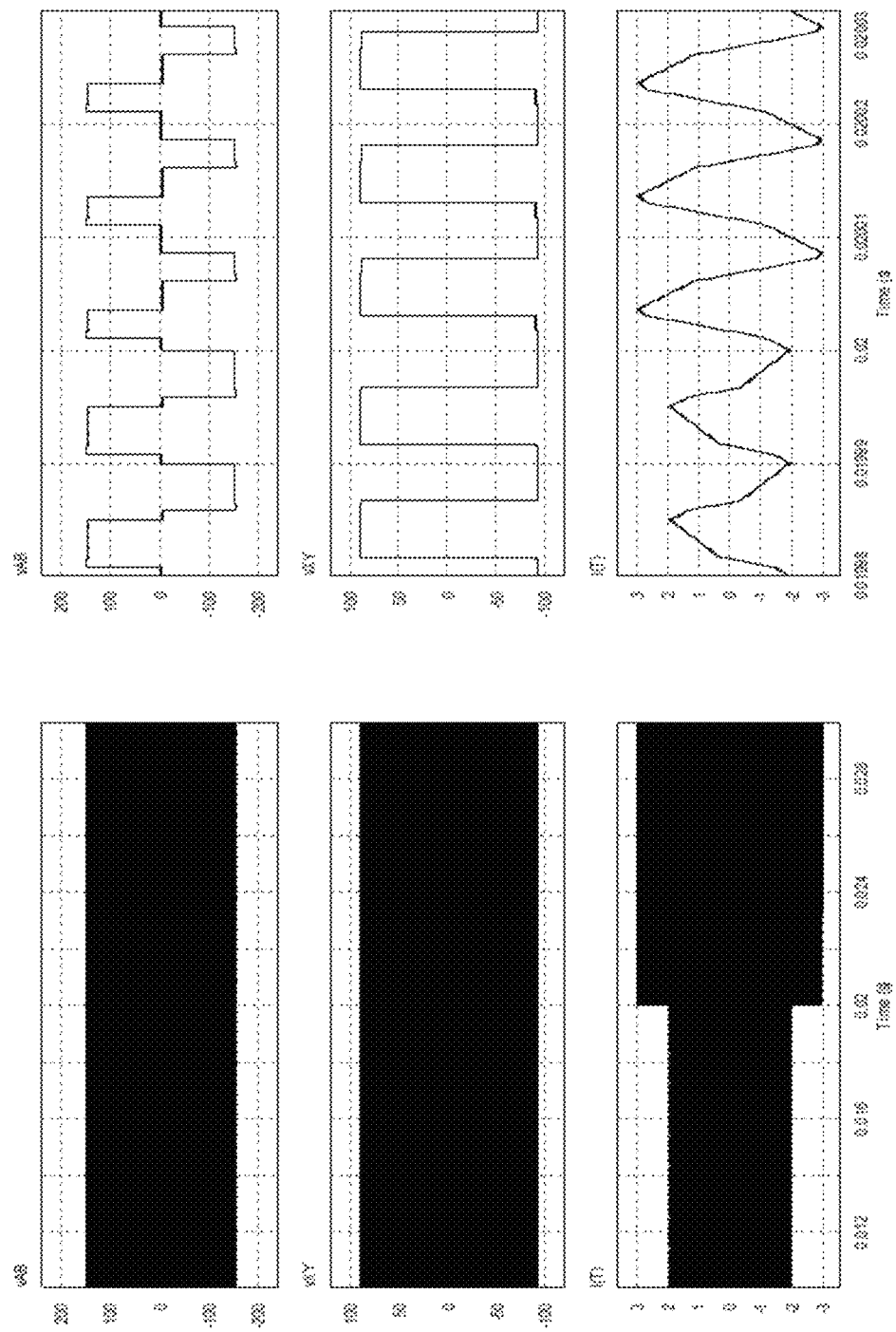
FIG. 10 are graphs showing simulated waveforms in the converter circuit of FIG. 2 when transiting from mode $A^+$ to mode $A^+$.

FIG. 10 shows simulation results of waveforms in the converter 200 during power transition when transiting from mode A$^+$ to mode A$^+$ using the method of FIG. 4B. As shown, the transition occurs instantaneously without abrupt disturbance to the current waveform.

Figure 11:
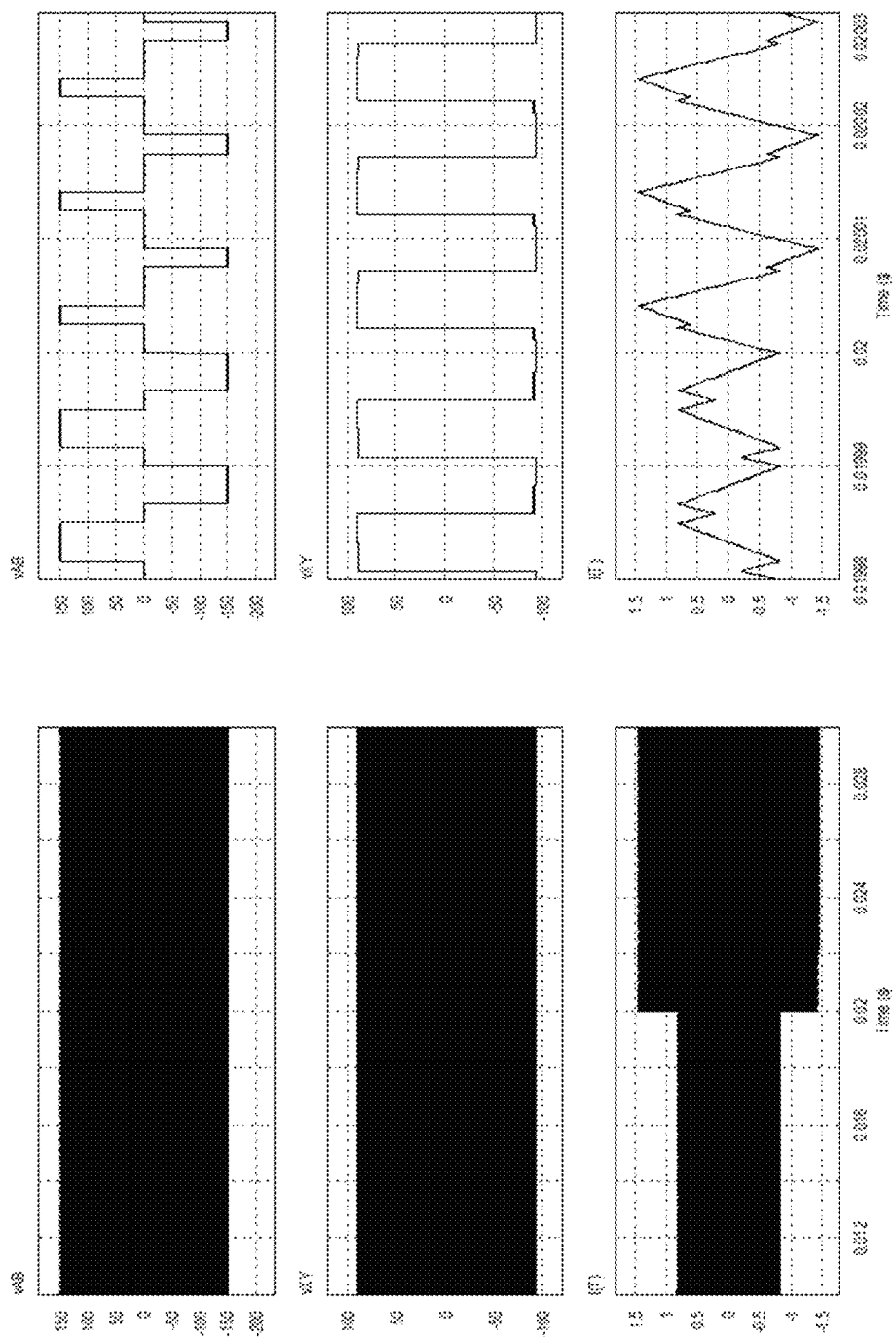
FIG. 11 are graphs showing simulated waveforms in the converter circuit of FIG. 2 when transiting from mode $B^+$ to mode $B^+$.

FIG. 11 shows simulation results of waveforms in the converter 200 during power transition when transiting from mode B$^+$ to mode B$^+$ using the method of FIG. 4B. As shown, the transition occurs instantaneously without abrupt disturbance to the current waveform.

Figure 12:
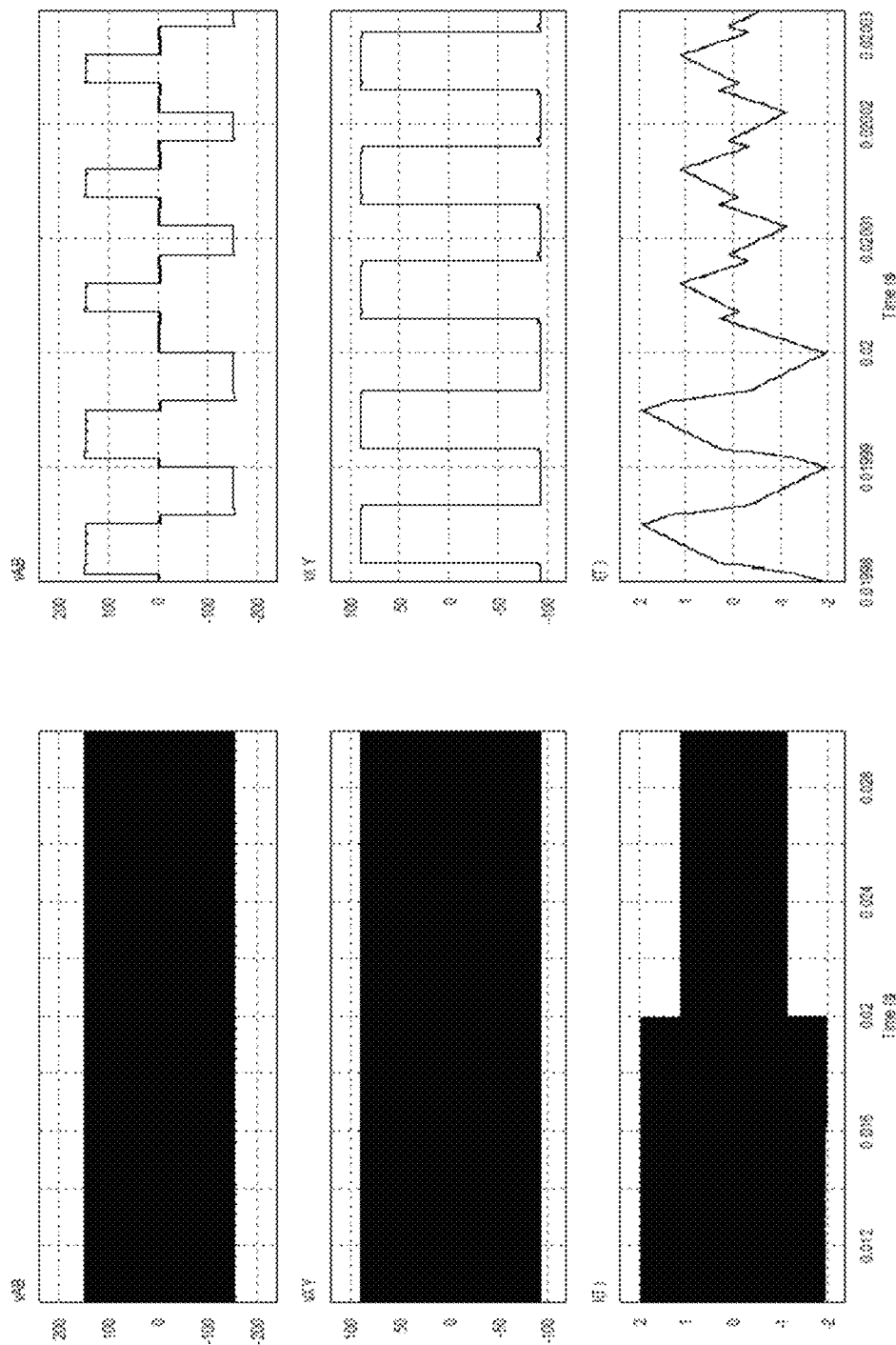
FIG. 12 are graphs showing simulated waveforms in the converter circuit of FIG. 2 when transiting from mode $A^+$ to mode $B^+$.

FIG. 12 shows simulation results of waveforms in the converter 200 during power transition when transiting from mode A$^+$ to mode B$^+$ using the method of FIG. 4B. As shown, the transition occurs instantaneously without abrupt disturbance to the current waveform.

Figure 13:
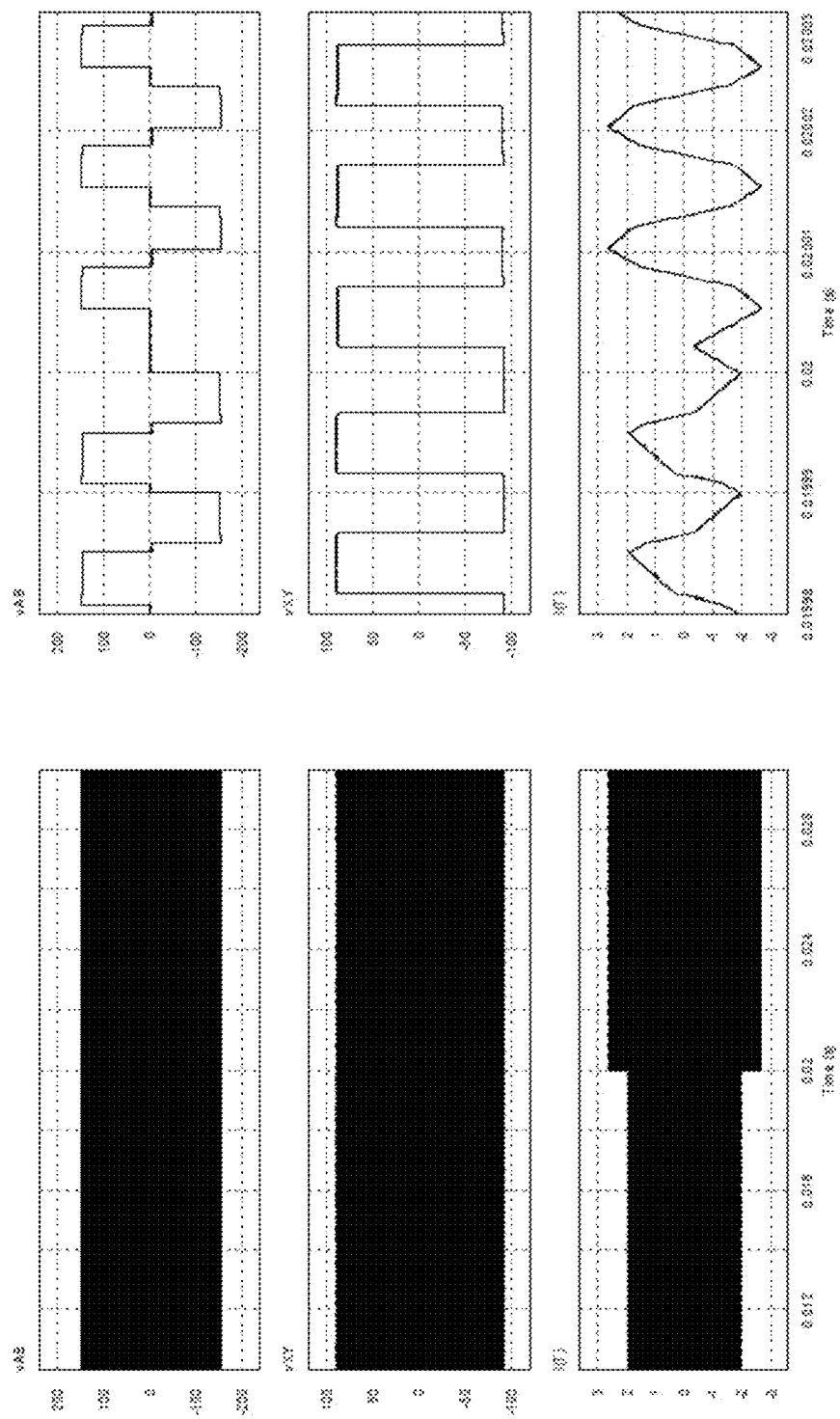
FIG. 13 are graphs showing simulated waveforms in the converter circuit of FIG. 2 when transiting from mode $A^+$ to mode $A^-$.

FIG. 13 shows simulation results of waveforms in the converter 200 during power transition when transiting from mode A$^+$ to mode A$^-$ using the method of FIG. 4B. As shown, the transition occurs instantaneously without abrupt disturbance to the current waveform.

Embodiments of the present invention provide an effective method to adjust power level in a bidirectional dc/dc converter. With the proposed method using two or more time controls (e.g., time delay controls), the required adjustments of control parameters during power transition can be executed such that it would not induce any unexpected peak current and non-zero dc bias current in the transformer in the converter circuit. Safe operation of switches and transformer can be guaranteed.

Although not required, the embodiments described with reference to the Figures can be implemented as an application programming interface (API) or as a series of libraries for use by a developer or can be included within another software application, such as a terminal or personal computer operating system or a portable computing device operating system. Generally, as program modules include routines, programs, objects, components and data files assisting in the performance of particular functions, the skilled person will understand that the functionality of the software application may be distributed across a number of routines, objects or components to achieve the same functionality desired herein.

It will also be appreciated that where the methods and systems of the present invention are either wholly implemented by computing system or partly implemented by computing systems then any appropriate computing system architecture may be utilized. This will include stand-alone computers, network computers and dedicated hardware devices. Where the terms "computing system" and "computing device" are used, these terms are intended to cover any appropriate arrangement of computer hardware capable of implementing the function described.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

Any reference to prior art contained herein is not to be taken as an admission that the information is common general knowledge, unless otherwise indicated.

The invention claimed is:

1. A method for controlling an operation of a converter circuit adapted to regulate power transfer between a first voltage source and a second voltage source, the method comprising the steps of:
   comparing a detected power value in the converter circuit with a power command value;
   determining a converter gain based on a detected first voltage level of the first voltage source and a detected second voltage level of the second voltage source;
   determining operation signals to be transmitted to switches in the converter circuit during a steady state to control switching time and switching duration of the switches;
   determining values of two or more variables associated with adjustment of switching time and switching duration of the switches based on the detected first and second voltage levels when the detected power value differs from the power command value; and
   determining operation signals to be transmitted to the switches during a power transition state based on the determined values of the two or more variables to adjust switching time and switching duration of the switches, thereby regulating power transition.

2. The method of claim 1, wherein the power command value is adjustable.

3. The method of claim 1, wherein the step of detecting the first voltage level comprises sampling the first voltage level.

4. The method of claim 1, wherein the step of detecting the second voltage level comprises sampling the second voltage level.

5. The method of claim 1, wherein the switches are semiconductor switches and the operation signals are gating signals of the semiconductor switches.

6. The method of claim 5, further comprising:
   generating and transmitting gating signals to the switches during the steady state; and
   generating and transmitting gating signals to the switches during the power transition state.

7. The method of claim 1, wherein the converter circuit comprises:
   a first switching circuit in the form of a bridge circuit, the first switching circuit having a first pair of switches and a second pair of switches connected in parallel with each other;
   a second switching circuit in the form of a bridge circuit, the second switching circuit having a third pair of switches and a fourth pair of switches connected in parallel with each other; and
   an inductive component coupling the first switching circuit with the second switching circuit; wherein the method comprises:
   controlling the first pair of switches, the second pair of switches, the third pair of switches, the fourth pair of switches so that they all have a substantially identical switching period $2T_p$ during steady state.

8. The method of claim 7, further comprising, during steady state and power transition state:
   switching on and off the first pair of switches complementarily;
   switching on and off the second pair of switches complementarily;

switching on and off the third pair of switches complementarily;
switching on and off the fourth pair of switches complementarily;
switching on and off one of the third pair of switches and one of the fourth pair of switches synchronously; and
switching on and off another one of the third pair of switches and another one of the fourth pair of switches synchronously.

9. The method of claim 8, further comprising, during steady state:
switching on and off the first pair of switches complementarily such that each of the first pair of switches has a duty cycle of about 50% with a dead time therebetween;
switching on and off the second pair of switches complementarily such that each of the second pair of switches has a duty cycle of about 50% with a dead time therebetween;
switching on and off the third pair of switches complementarily such that each of the third pair of switches has a duty cycle of about 50% with a dead time therebetween;
switching on and off the fourth pair of switches complementarily such that each of the fourth pair of switches has a duty cycle of about 50% with a dead time therebetween.

10. The method of claim 8, wherein the step of determining operation signals during steady state comprises:
determining a first duration $T_{d1}$ from a switch-on time of one of the first pair of switches $s_{1u}$ to a switch-on time of one of the second pair of switches $s_{2d}$; and
determining a second duration $T_{d2}$ between the switch-on time of the one of the first pair of switches $s_{1u}$ and a switch-on time of one of the fourth pair of switches $s_{4u}$;
wherein $T_p$ is half switching period of the switches, $$D_1 = \frac{T_{d1}}{T_p}, D_2 = \frac{T_{d2}}{T_p}, O < D_1 < 1, \text{ and } \frac{D_1 - 1}{2} < D_2 < \frac{D_1 + 1}{2}.$$

11. The method of claim 8, wherein the step of determining operation signals during power transition comprises:
controlling a switch-on duration of one of the second pair of switches $s_{2u}$ to $(1+d_1) T_p - T_x$;
controlling a switch-on duration of one of the third pair of switches $s_{3u}$ and one of the fourth pair of switches $s_{4d}$ to $(1+d_2) T_p - T_x$; and
controlling a switch-on duration of one of the first pair of switches $s_{1u}$ to $T_p - T_x$,
wherein $$T_x = \left(d_2 - \frac{d_1}{M}\right) \cdot T_p$$

where $d_1$, $d_2$ are the two or more variables that are determined based on predetermined rules, and M is the converter voltage gain.

12. The method of claim 11, wherein the control of the switch-on durations are applied only once between steady states.

13. The method of claim 1, wherein the converter circuit is a dual active bridge isolated bi-directional DC-DC converter.

14. The method of claim 1, wherein the switches are controlled to regulate one or both of:
power transfer from the first voltage source to the second voltage source; and
power transfer from the second voltage source to the first voltage source.

15. A controller for controlling operation of a converter circuit adapted to regulate power transfer between a first voltage source and a second voltage source, the controller comprises
means for comparing a detected power value in the converter circuit with a power command value;
means for determining a converter gain based on a detected first voltage level of the first voltage source and a detected second voltage level of the second voltage source;
means for determining operation signals to be transmitted to switches in the converter circuit during a steady state to control switching time and switching duration of the switches;
means for determining values of two or more variables associated with adjustment of switching time and switching duration of the switches based on the detected first and second voltage levels when the detected power value differs from the power command value; and
means for determining operation signals to be transmitted to the switches during a power transition state based on the determined values of the two or more variables to adjust switching time and switching duration of the switches, thereby regulating power transition.

16. The controller of claim 15, further comprising one or more of:
means for sampling the first voltage level; and
means for sampling the second voltage level.

17. The controller of claim 15, further comprising:
means for generating and transmitting operation signals in the form of gating signals to the switches during the steady state; and
means for generating and transmitting operation signals in the form of gating signals to the switches during the power transition state.

18. The controller of claim 15, further comprising:
means for switching on and off a first pair of switches of the converter circuit complementarily;
means for switching on and off a second pair of switches of the converter circuit complementarily;
means for switching on and off a third pair of switches of the converter circuit complementarily;
means for switching on and off a fourth pair of switches of the converter circuit complementarily;
means for switching on and off one of the third pair of switches and one of the fourth pair of switches synchronously; and
means for switching on and off another one of the third pair of switches and another one of the fourth pair of switches synchronously.

19. The controller of claim 18, further comprising:
means for switching on and off the first pair of switches complementarily during steady state such that each of the first pair of switches has a duty cycle of about 50% with a dead time therebetween;
means for switching on and off the second pair of switches complementarily during steady state such that each of the second pair of switches has a duty cycle of about 50% with a dead time therebetween;

means for switching on and off the third pair of switches complementarily during steady state such that each of the third pair of switches has a duty cycle of about 50% with a dead time therebetween;

means for switching on and off the fourth pair of switches complementarily during steady state such that each of the fourth pair of switches has a duty cycle of about 50% with a dead time therebetween.

20. The controller of claim 18, further comprising one or more of:

means for determining, during steady state, a first duration $T_{d1}$ from a switch-on time of one of the first pair of switches $s_{1u}$ to a switch-on time of one of the second pair of switches $s_{2d}$;

means for determining, during steady state, a second duration $T_{d2}$ between the switch-on time of the one of the first pair of switches $s_{1u}$ and a switch-on time of one of the fourth pair of switches $s_{4u}$;

means for controlling, during power transition state, a switch-on duration of one of the second pair of switches $s_{2u}$ to $(1+d_1) T_p - T_x$;

means for controlling, during power transition state, a switch-on duration of one of the third pair of switches $s_{3u}$ and one of the fourth pair of switches $s_{4d}$ to $(1+d_2) T_p - T_x$; and means for controlling, during power transition state, a switch-on duration of one of the first pair of switches $s_{1u}$ to $T_p - T_x$, wherein $T_p$ is half switching period of the switches, $$D_1 = \frac{T_{d1}}{T_p}, D_2 = \frac{T_{d2}}{T_p}, 0 < D_1 < 1, \text{ and } \frac{D_1 - 1}{2} < D_2 < \frac{D_1 + 1}{2};$$

and wherein $$T_x = \left(d_2 - \frac{d_1}{M}\right) \cdot T_p$$

where $d_1$, $d_2$ are the two or more variables that are determined based on predetermined rules, and M is the converter voltage gain.

21. A non-transient computer readable medium for storing computer instructions that, when executed by one or more processors, causes the one or more processors to perform a method for controlling an operation of a converter circuit adapted to regulate power transfer between a first voltage source and a second voltage source, the method comprising the steps of:

comparing a detected power value in the converter circuit with a power command value; determining a converter gain based on a detected first voltage level of the first voltage source and a detected second voltage level of the second voltage source; determining operation signals to be transmitted to switches in the converter circuit during a steady state to control switching time and switching duration of the switches; determining values of two or more variables associated with adjustment of switching time and switching duration of the switches based on the detected first and second voltage levels when the detected power value differs from the power command value; and determining operation signals to be transmitted to the switches during a power transition state based on the determined values of the two or more variables to adjust switching time and switching duration of the switches, thereby regulating power transition.

* * * * *